US011704732B1

(12) United States Patent
Plenet de Badts de Cugnac (10) Patent No.: US 11,704,732 B1
(45) Date of Patent: Jul. 18, 2023

(54) SYSTEM FOR STREAMLINED ASSETIZATION OF A REVENUE STREAM

(71) Applicant: Assetize SARL, Luxembourg (LU)

(72) Inventor: Charles Plenet de Badts de Cugnac, Dubai (AE)

(73) Assignee: Assetize SARL, Luxembourg (LU)

( * ) Notice: Subject to any disclaimer, the term of this patent is extended or adjusted under 35 U.S.C. 154(b) by 0 days.

(21) Appl. No.: 17/868,897

(22) Filed: Jul. 20, 2022

(51) Int. Cl.
  *G06Q 40/03* (2023.01)
  *G06Q 20/06* (2012.01)
  *H04L 9/32* (2006.01)

(52) U.S. Cl.
  CPC ........... *G06Q 40/03* (2023.01); *G06Q 20/065* (2013.01); *H04L 9/3213* (2013.01); *H04L 2209/56* (2013.01)

(58) Field of Classification Search
  CPC .. G06Q 40/025; G06Q 20/065; H04L 9/3213; H04L 2209/56
  USPC ........................................................ 705/38
  See application file for complete search history.

(56) References Cited

U.S. PATENT DOCUMENTS

| | | | | |
|---|---|---|---|---|
| 7,620,595 B1 * | 11/2009 | Holt et al. | ............. | G06Q 40/00 705/38 |
| 7,747,518 B2 * | 6/2010 | Caballero et al. | ...... | G06Q 40/00 705/38 |
| 10,438,290 B1 * | 10/2019 | Winklevoss et al. | .. | G06Q 40/06 |
| 2009/0248573 A1 * | 10/2009 | Haggerty et al. | ...... | G06Q 40/00 705/38 |
| 2020/0042995 A1 * | 2/2020 | Snow et al. | ....... | G06Q 20/3678 |
| 2020/0042998 A1 * | 2/2020 | Snow et al. | ....... | G06Q 20/3672 |
| 2020/0342539 A1 * | 10/2020 | Doney | .................... | G06Q 40/06 |
| 2021/0142302 A1 * | 5/2021 | Anderson et al. | . | G06Q 20/0655 |
| 2022/0284419 A1 * | 9/2022 | Tedesco et al. | ..... | G06Q 20/3678 |
| 2022/0343325 A1 * | 10/2022 | Hu | ...................... | G06Q 20/3223 |

FOREIGN PATENT DOCUMENTS

KR  102467373 B1 * 11/2022 ......... G06Q 30/0619

OTHER PUBLICATIONS

Luo et al., Blockchain architecture and its applications in bank risk mitigation framework, May 28, 2021, School of Economics, Xihua University, Chengdu, P.R. China. (Year: 2021).*
Taylor, The Robots Are Coming to Corporate Finance, May 1, 2018, Forbes Technology Council, www.forbes.com. (Year: 2018).*
Andolfatto et al., The Blockchain Revolution: Decoding Digital Currencies, Third Quarter 2022, Review—Federal Reserve Bank of St. Louis, 104.3:149-165. (Year: 2022).*

(Continued)

*Primary Examiner* — Scott C Anderson
*Assistant Examiner* — George N. Proios
(74) *Attorney, Agent, or Firm* — Dana Legal Services; Jubin Dana (57) ABSTRACT

A payment gateway is configured to directly access a revenue stream and financial information about the revenue stream. A machine learning (ML) model is trained to continuously process the financial information about the revenue stream to continuously analyze and score the revenue stream. A smart contract factory is responsive to the scoring by the ML model to generate at least one smart contract on a distributed, decentralized network. The smart contract is programmed to receive payments in stablecoins with respect to revenue stream.

18 Claims, 6 Drawing Sheets

(56) References Cited

OTHER PUBLICATIONS

OECD, Artificial Intelligence, Machine Learning and Big Data in Finance: Opportunities, Challenges and Implications for Policy Makers, https://www.oecd.org/financial/artificial-intelligence-machine-learning-big-data-in-finance.htm. (Year: 2021).*

* cited by examiner

SYSTEM FOR STREAMLINED ASSETIZATION OF A REVENUE STREAM

BACKGROUND

Online lending can be direct, private, or peer-to-peer (P2P). A party interested in obtaining a loan typically completes an online application. The application is evaluated, risk and credit rating of the applicant are determined, and an appropriate interest rate range is determined. The determined loan terms are then communicated to borrower, who acknowledges with desired loan terms. Once a lender accepts the borrower's desired loan terms, an agreement is generated. Then the lender forwards loan funds to the borrower. The borrower repays the loan by making periodic loan payments.

The technology and process for applying for a loan are non-linear, inconsistent, and time-consuming. Moreover, if financial conditions of the borrower improve, and the borrower seeks an additional loan, the borrower must go through the loan process again. Processing the additional loan taxes the computational resources of the lending platform, as it consumes additional memory, network bandwidth, and processor cycles.

Better technology is needed.

SUMMARY

In accordance with various embodiments and aspects herein, computer systems, methods and computer-readable media comprise a payment gateway configured to directly access a revenue stream and financial information about the revenue stream; a machine learning (ML) model trained to continuously process the financial information about the revenue stream to continuously analyze and score the revenue stream; and a smart contract factory, responsive to the scoring by the ML model, for generating at least one smart contract on a distributed, decentralized network. The smart contract is programmed to receive payments in stablecoins with respect to revenue stream.

DETAILED DESCRIPTION

The following describes various aspects of the present technology. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with an embodiment is included in at least one embodiment.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments described herein are merely exemplary, and should not be construed as limiting of the scope or spirit of the claims as appreciated by those of ordinary skill in the art. All statements herein reciting principles, aspects, and embodiments are intended to encompass both structural and functional equivalents thereof. Furthermore, to the extent that the terms "including", "includes", "having", "has", "with", or variants thereof are used in either the detailed description and the claims, such terms are intended to be inclusive in a similar manner to the term "comprising."

As used herein, a smart contract refers to a self-executing contract with the terms of an agreement between parties being directly written into lines of code. The code and the agreement contained therein exists across a distributed, decentralized network. The code controls the execution, and transactions are trackable and irreversible. One example of a distributed decentralized network is Ethereum blockchain. Ethereum is a decentralized, open-source blockchain with smart contract functionality. Ether is its native cryptocurrency.

A computer system herein is configured to convert a revenue stream to an asset (that is, "assetize" the revenue stream). For example, a party has a steady stream of revenue, and wishes to use that revenue stream to secure a loan. A computer system herein can assetize that revenue stream. The assetized income stream can then be used to secure the loan.

A computer system herein is further configured to generate at least one smart contract on a distributed, decentralized network. The smart contract directs payments with respect to the revenue stream. For example, if the assetized revenue stream is used to secure a loan, a computer system herein may automatically make loan payments by drawing funds directly from the income stream and disbursing the funds to one or more lenders.

Figure 1:
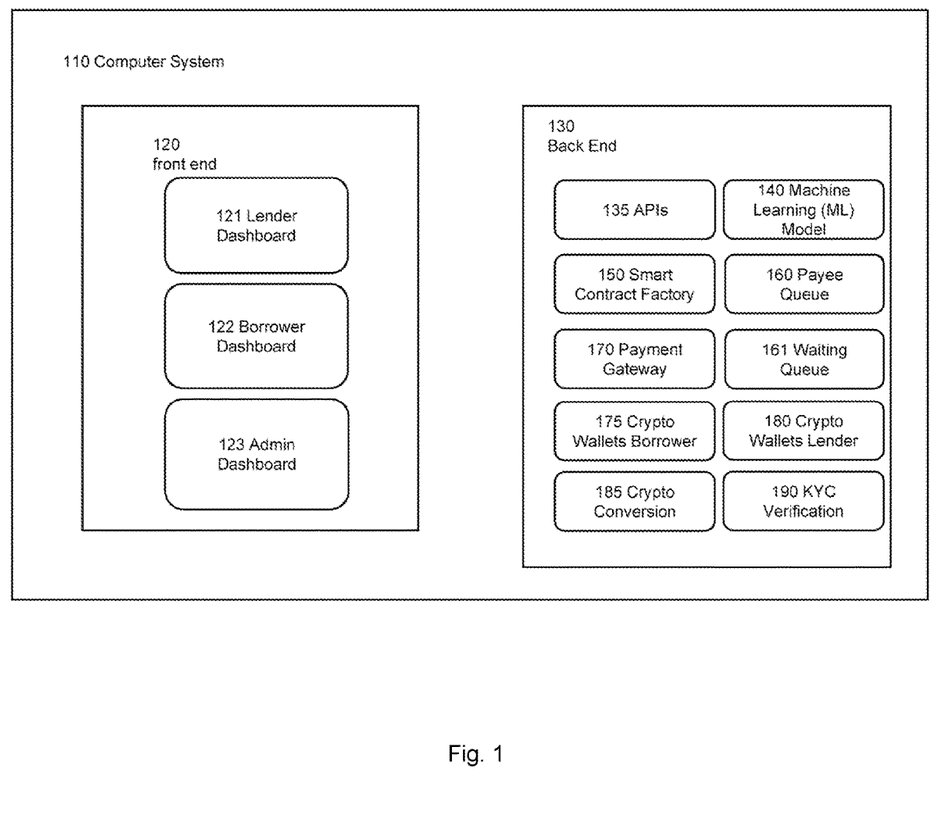
FIG. 1 is an illustration of a computer system for converting a revenue stream to an asset.

Reference is made to FIG. 1, which illustrates a computer system 110 including a front end 120 and a back end 130. The computer system 110 includes a processing unit and memory. The following elements of the front end 120 and the back end 130 are stored in the memory and executed by the processing unit.

The front end 120 includes dashboards such as lender dashboard 121, borrower dashboard 122, and admin dashboard 123. These dashboards 121, 122 and 123 enable users to interface with the system 110, such as enabling a borrower to submit financial information about a revenue stream. The front end 120 also allows the borrower to provide authorization to access the revenue stream by an integrating payment gateway 170, and accept terms of use.

The back end 130 includes application programming interfaces (APIs) 135 for integrating with financial services. The APIs 135 allow the system 110 to access a user's revenue stream. For instance, the APIs 135 allow the system 110 to withdraw funds from the revenue stream. The APIs 135 also integrate with the user's financial services to obtain historical information about the revenue stream, such as accounting, billing and customer relationship management (CRM) data.

The back end 130 includes a machine learning (ML) model 140 for analyzing the financial information. For instance, the ML model 140 is trained to process the financial information to generate a score for the revenue stream. Depending on the training, the score may indicate different aspects, such as financial health relative to similar companies, and risk assessments and guidelines on investments to investors and borrowers. If there are top-tier venture capital firms that provide financial backing, there is a de-risk component.

In some embodiments, the ML model 140 may be trained on the historical accounting data, billing data, metrics and analytics, and CRM data associated with a revenue stream. The training determines the relative weights of the ML model 140. Accounting and billing data may include, without limitation, due diligence, corporate profits, financials, business performance and governance, and outlook. Tools for providing metrics and analytics are available from Google analytics, Userpilot, Heap, NapoleonCat, smart karrot, and ProfitWell. Examples of CRMs include activecampaign, HubSpot, and Zoho. Data of interest may include churn rate, activation rate, MRR (monthly recurring revenue), CLV (customer lifetime value), renewal rate, revenue retention, and MRR growth rate.

The training may be based on historical data at both a macro-level and a micro-level. An example of micro-level data is credit card data. For instance, credit card data repeats on average 4.7 times a week in a restaurant with an average basket of 20 US dollars (USD) for the past seven months. As an example of macro-level data, a restaurant has had for last three years, 87% full capacity rate, with an average basket of 26.5 USD. As another example of macro-level data, a music streaming service has users paying a monthly fee of 10 USD per month. Of that fee, the streaming service keeps 3 USD.

The ML model 140 might be trained for a particular industry. Therefore, the back end 130 might store multiple trained ML models 140, and apply the appropriate model 140 to a company generating the revenue stream. In a different embodiment, the system 110 might store only a single ML model 140 that is applicable across several industries.

After the scoring has been performed, the score is used to generate certain terms of a contract.

The back end 130 further includes a smart contract factory 150 for generating at least one smart contract that incorporates the score-derived contract terms and that self-executes payments according to the contract terms. Each smart contract is then deployed.

The back end 130 further includes a payee queue 160. Each entry in the payee queue 160 identifies a party that will be paid under the terms of the smart contract. The smart contract factory 150 incorporates payees to the queue 160. In some embodiments, the payee queue 160 may include a first-in, first-out buffer.

The back end 130 further includes the payment gateway 170. The payment gateway 170 directly accesses the revenue stream via the APIs 135, and can take funds out of the revenue stream. A cryptocurrency conversion module 185 converts fiat money (that is, government-issued currency) into stablecoins, and the smart contract factory 150 can disburse those funds to the payees in the payee queue 160 pursuant to the terms of a smart contract.

Thus, the computer system 110 ensures that payees receive their payments, without delay. The computer system 110 also eliminates the computational resources associated with manually making payments.

Continuous processing by the ML model 140 has certain advantages. Real-time changes to the revenue stream can be detected, and the revenue stream can be rescored. If the new score indicates an improved outlook for the revenue stream, the assetized value of the revenue stream may be increased, and the smart contract may be automatically adjusted in accordance with the increased assetized value, through inputs received from software intermediaries of new additional data. An example is provided below.

The payee queue 160 offers additional advantages. The payee queue 160 enables new payees to be automatically added, and matured payees to be automatically removed. In conjunction with the ML model 140 and the smart contract factory 150, terms of a contract can be automatically updated, through information collected from software intermediaries.

The back end 130 may further include a waiting queue 161. As will be seen below, the waiting queue 161 enables future payees to be automatically added, thereby further increasing processing speed and further reducing network traffic.

Some configurations of the computer system 110 may include crypto wallets such as a borrower crypto wallet 175 and a lender crypto wallet 180, along with the cryptocurrency conversion module 185. If an investment with fiat money is made under the terms of the smart contract, the fiat money may be placed in a safeguarding account (not shown). The conversion module 185 converts that money to the stablecoin cryptocurrency (e.g., ERC20, USDT, USDC, Dai), which is stored in the lender crypto wallet 180. Similarly, funds taken from the revenue stream can be converted into cryptocurrency and storied in the borrower crypto wallet 175. Some configurations of the computer system 110 may also include a "know your customer" ("KYC") verification module 190.

Processing time is reduced substantially. Each transfer using cryptocurrencies and blockchains takes a few seconds, whereas the transfer of fiat money can take hours if not days. While the fiat money is in safeguarding account, the cryptocurrency can change wallets multiple times without the fiat currency leaving the safeguarding account.

The smart contract factory 150 may be further configured to generate digital tokens for parties to a smart contract. One example of a digital token is a non-fungible token (NFT). For instance, if the smart contract specifies a loan, the digital token provides proof of a lender's investment. The digital token may represent a lender's investment share and may store the legal loan agreement document in its metadata, as well as the key terms and parameters of the loan. After a loan is paid off, the digital token becomes void.

The system 110 is not limited to any particular type of business arrangement, but is useful for facilitating loans. A loan may be personal or commercial, secured or unsecured. A loan may be between a single financial institution and one individual, or multiple lenders and borrowers. However, the system 110 is particularly useful to facilitate a large loan by aggregating a large number of small investments.

FIGS. 2-6 illustrate an example of using the system 110 to facilitate a loan. In this example, Ethereum is the blockchain. There is one borrower and multiple lenders, as no single lender is willing to incur the risk of funding the entire loan. As will be seen, the system 110 enables the loan process to be streamlined.

Figure 2:
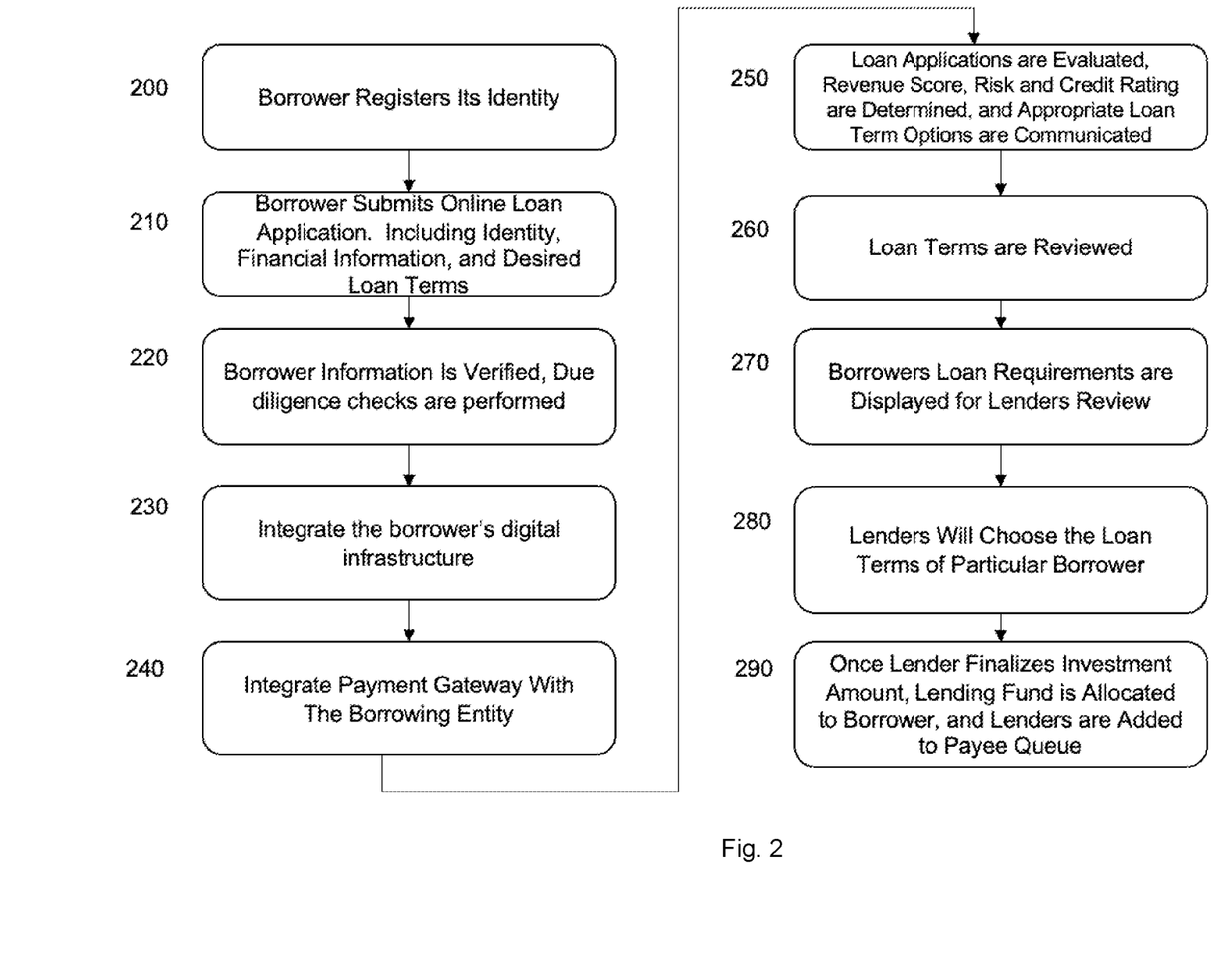
FIGS. 2-6 are illustrations of a method of using the computer system of FIG. 1.

Reference is now made to FIG. 2. At step 200, a borrower registers as an entity with the system 110 using the borrower dashboard 122. Registration information could include basic details and contact information of the borrower. As part of the registration, the borrower sets up a crypto wallet 175.

At step 210, the borrower submits an online loan application via the borrower dashboard 122. The loan application might request the identity of the borrower and borrowing entity, financial information and desired loan terms. Desired loan terms might include currency, amount of loan, preferred interest rate (set as a range), loan duration, and payment schedule. The online loan application also requests the borrower to identify a revenue stream and information associated with the revenue stream. The type of information is of the type used by the ML model 140.

At step 220, the borrower information is verified, Due Diligence checks are performed using the KYC verification module 190.

At step 230, the borrower provides information that allows the APIs 135 to integrate the borrower's digital infrastructure (e.g., borrower website, banking software, accounting software, subscription management software, CRM software) with the system 110.

At step 240, the payment gateway 170 is integrated with the borrowing entity using the APIs 135. This will help to monitor the financial information of the borrowing entity and to process the payments.

At step 250, the loan application is evaluated, and risk and credit rating are determined, and loan term options are communicated to the borrower. In addition, the ML model 140 processes the financial information to score the revenue stream. The application may be reviewed by one or more people, and/or it may be reviewed by artificial intelligence. During the review, an interest rate bracket will be communicated to the borrower. Opting for a higher interest rate by the borrower may improve chances of raising the funds, although approval might not be guaranteed.

At step 260, the borrower then reviews the loan terms provided by the system 110 and submits his or her desired loan terms. The borrower's desired interest rate will then be used in the agreement.

At step 270, the borrower's loan terms are displayed via the borrower dashboard 122 to any potential lenders who have previously registered with the system 110.

At step 280, any lender who is interested in funding the loan and who agrees with the terms of the borrower, can inform the borrower of their interest via the lender dashboard 121. Each candidate lender may indicate the amount they would like to invest.

At step 290, once a lender finalizes an investment amount, a lending fund is allocated to the borrower. That lender is added to the payee queue 160. The lender deposits fiat currency in a safeguarding account. The conversion module 185 converts the fiat currency to cryptocurrency and stores the cryptocurrency in the lender crypto wallet 180.

Figure 3:
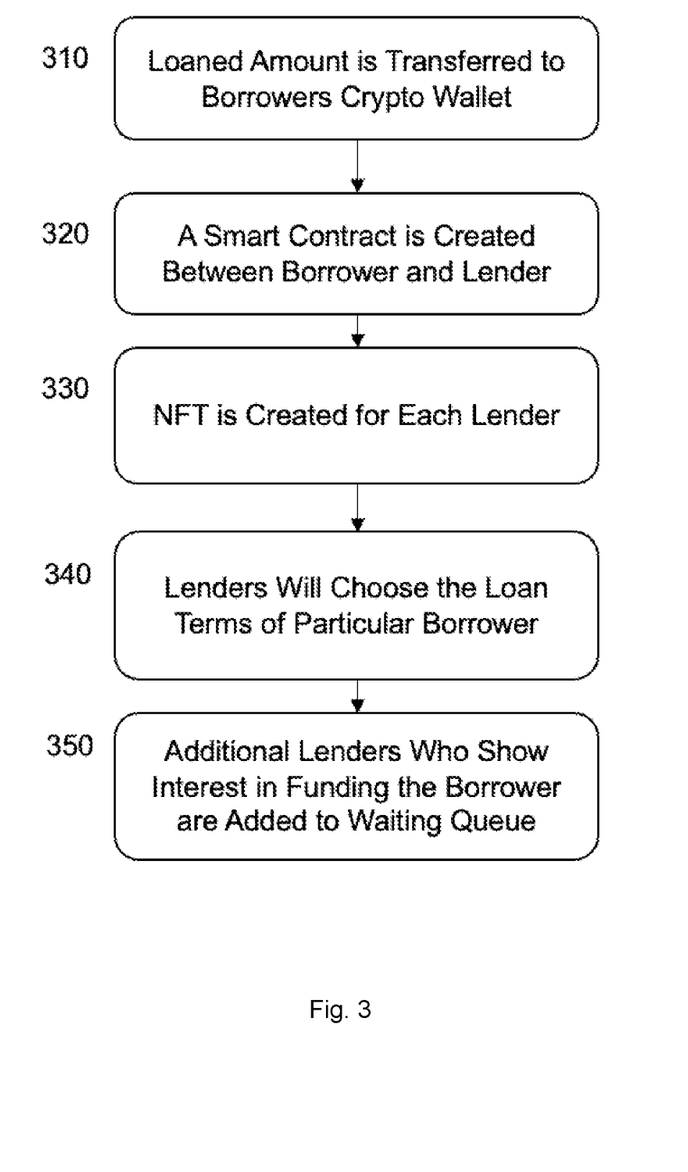

Reference is now made to FIG. 3. At step 310, loaned funds are transferred to the borrower. Each lender will transfer their agreed loaned amount in stablecoin cryptocurrency from their crypto wallet 180 to the borrower crypto wallet 175. This transaction is added to the blockchain.

At step 320, the contract factory 150 creates at least one smart contract, where the contract terms are coded into the blockchain. There may be one smart contract created for each selected lender, or a contract that covers multiple selected lenders.

At step 330, the contract factory 150 mints a non-fungible token (NFT) for each selected lender. At step 340, NFT are sent to their respective lender crypto wallets 180.

At step 350, additional lenders who show interest in funding the borrower are added to the waiting queue 161 for any new loan requirements from the borrower.

Thus, the loan process is streamlined. The revenue stream is assetized quickly, with little or no delay. Loan funds are identified quickly, with little or no delay. Moreover, the system 110 enables a large loan to be generated by a large number of small investments. As a result, risk associated with a large loan can be spread out over a number of small investors.

Figure 4:
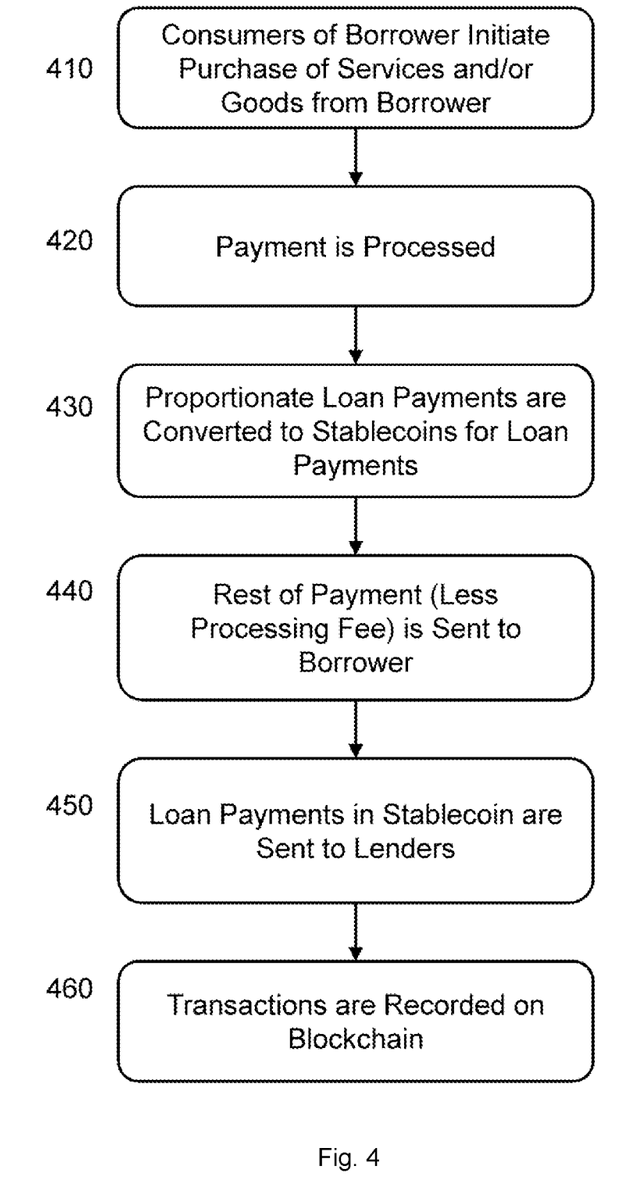

Reference is now made to FIG. 4, which illustrates an example of steps for repayment of the loan. At step 410, money is added to the revenue stream. For example, a customer of the borrower purchases goods and/or services from the borrower.

At steps 420, 430 and 440, the payment gateway 170, via an API 135, processes the payment by retaining a sum for the loan payment, converting the sum to stablecoins, and forwarding the rest, excluding platform fees, to the borrower. For example, a monthly loan payment of $50 is due, and a consumer purchases $200 worth of the borrower's goods, and a processing fee is $2. The sum of $50 is retained for the loan payment, converted to an equivalent amount of stablecoins, and paid to the lender(s), while and the sum of $148, (after the processing fee is deducted) is forwarded to the borrower's bank account. Another purchase of $100 is made while the payment due is $0, so the payment gateway 170 forwards $99 to the borrower's bank account and retains a processing fee of $1.

At step 450, loan payments in stable coins are sent to the lenders. Proceeds are distributed among lenders to their respective crypto wallets 180.

At step 460, the transaction is recorded on blockchain. For instance, the transaction is broadcast to all computers participating in the specific blockchain network. The transaction is verified and stored into a block, and the block is added to the blockchain. The smart contract knows the amount and date of the loan payment.

Figure 5:
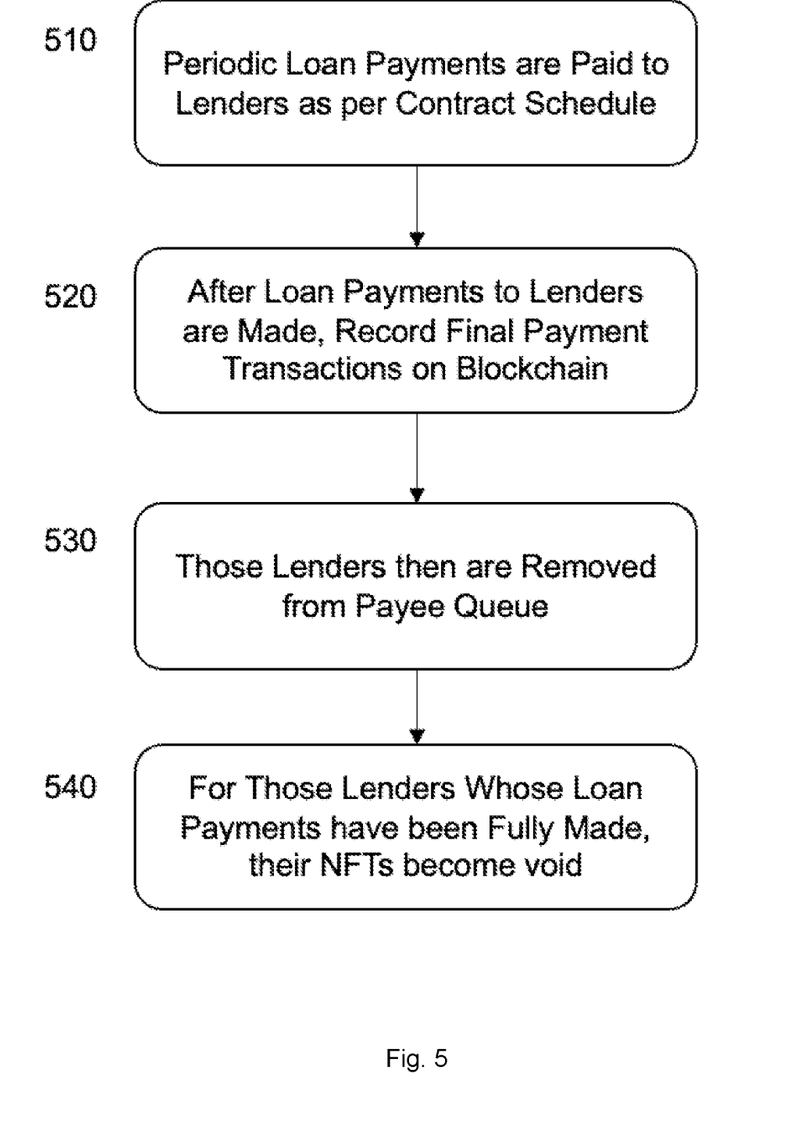

Reference is now made to FIG. 5, which illustrates the steps for terminating a loan. At step 510, periodic loan payments are made to the lenders as per contract schedule. At step 520, after all the loan payment proceeds have been paid. or some other action has satisfied or discharged the loan obligation, final payment transactions are recorded on the blockchain. At step 530, those lenders are then removed from payee queue 160. At step 540 the NFTs of those lenders are made void.

Figure 6:
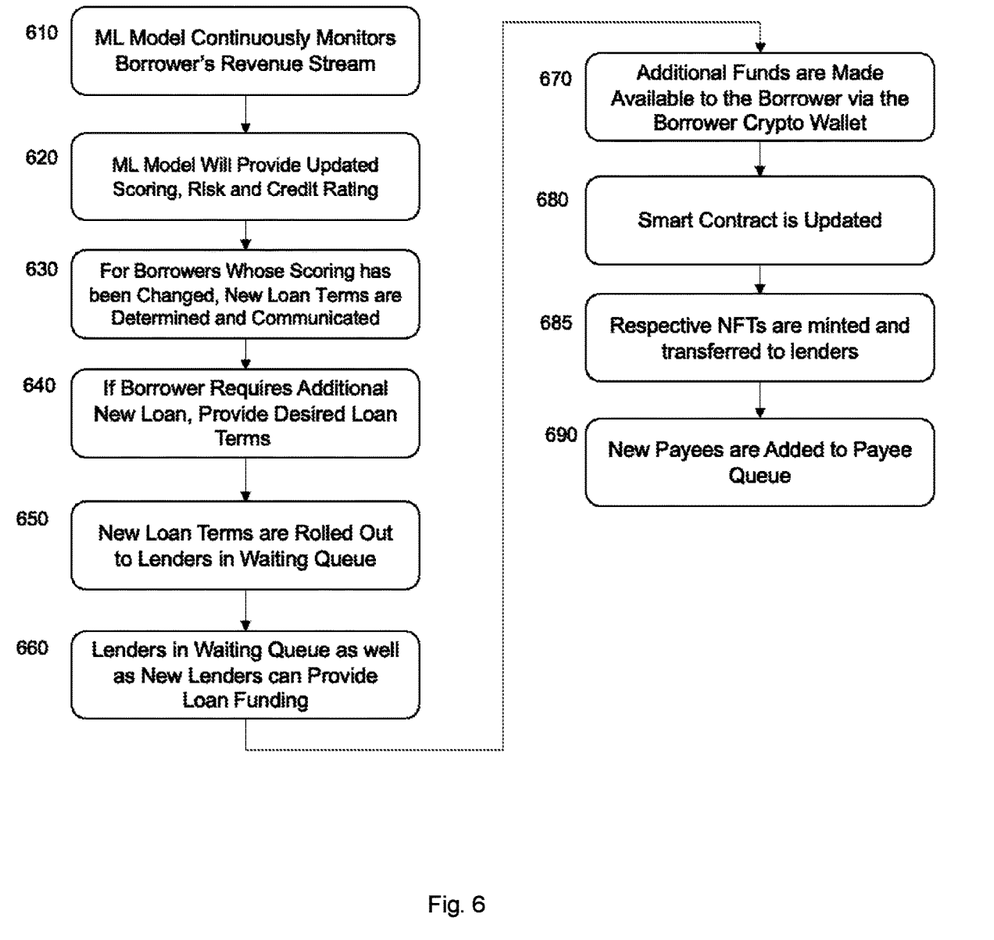

Reference is now made to FIG. 6, which illustrates the steps for increasing loan funds. At step 610, the ML model 140 is continuously monitoring the borrower's revenue stream. At step 620, the ML model 140 provides an updated scoring, risk and credit rating. For instance, the ML model 140 generates a series of scores indicating that the borrower's financial conditions have improved over time, the revenue stream has increased, and the revenue stream can now support additional funding.

At step 630 for a borrower whose scoring been changed, new loan terms are determined and communicated to the borrower for any additional new loan. For instance, a determination is made that the loan amount may be increased as supported by the higher revenue stream. If the increase is approved, the borrower is notified.

At step 640, if the borrower desires an additional new loan, he can provide desired loan terms. At step 650 the desired loan terms are rolled out to those lenders in the waiting queue 161 and any new lenders. At step 660, the lenders in waiting queue 161 as well as new lenders can agree to provide loan funding to the borrower if the new loan terms are acceptable. At step 670, the additional funds are made available to the borrower via the borrower crypto wallet 175

At step 680, the smart contract is updated to accommodate the terms of new loan contract and at step 685 respective NFTs are minted and transferred to the lenders. At step 690, new payees been added to payee queue 160.

Consider the example where the borrower's score has improved and is now able to raise an extra $100K with 1% decreased interest rate compared to previous lending terms. The new information is communicated to borrower, who can provide his desired loan terms and amount to be raised for lender review. The lenders in the waiting queue 161 and/or new lenders who find the terms of loan acceptable can provide the loan funds by entering into an agreement or agreements. The new lending terms are incorporated in one or more smart contracts for the new lenders, and those new lenders are added to the payee queue 160.

The system 110 streamlines the increase in funding. There is no need for the borrower to apply for a new loan to get the additional funding, nor is there a need to find new lenders. Steps are performed automatically in real time. And because another loan application is not required, and resources are not spent processing the new loan application, burdens on memory, network bandwidth and computational resources of the computer system 110 are reduced.

Practitioners skilled in the art will recognize many modifications and variations may include any relevant combination of the disclosed features. Descriptions herein reciting principles, aspects, and embodiments encompass both structural and functional equivalents thereof.

What is claimed is:

1. A computer system comprising:
   a processing unit configured to directly access a revenue stream, data about the revenue stream, and financial information about the revenue stream in order to collect training data and is capable of processing payments from the revenue stream;
   a machine learning (ML) model trained using the collected training data, wherein the trained ML model continuously processes and analyzes the revenue stream to assign a score to the revenue stream; and
   a smart contract factory, responsive to the scoring of the revenue stream by the ML model, for generating at least one smart contract, wherein the smart contract factory generates a digital token for the revenue stream thereby allowing the processed payments to be transferrable using the digital token.

2. The system of claim 1, wherein the digital token is Ethereum blockchain.

3. The system of claim 1, wherein the processing unit is configured to make payments by directly drawing funds from the revenue stream and disbursing the funds.

4. The system of claim 3, further comprising a payee queue; wherein the smart contract factory is configured to generate the at least one smart contract for one or more payees and add payees to the payee queue; and wherein the processing unit is directed to disburse the funds to the payees in the payee queue.

5. The system of claim 4, wherein the continuous processing detects real-time changes in the revenue stream; and wherein the smart contract factory is configured to adjust entries in the payee queue and smart contract terms according to the detected changes.

6. The system of claim 4, further comprising a waiting queue for future payees.

7. The system of claim 4, wherein the computer system includes a front end and a back end, the front end configured to collect certain terms of the at least one smart contract, the back end including the ML model, the payee queue, the smart contract factory, and the processing unit.

8. The system of claim 1, wherein the ML model has been trained on historical data including accounting data, billing data, and CRM data associated with the revenue stream.

9. The system of claim 1, further comprising a module for cryptocurrency conversion, wherein all monetary transfers within the system are made with the stablecoins.

10. The system of claim 1, wherein the smart contract factory is further configured to generate a digital token for each party to each smart contract.

11. A method of using the server system of claim 1 to make a loan between a borrower and at least one lender based on the borrower's revenue stream, the method comprising:
    using the processing unit to access the borrower's revenue stream;
    using the ML model to continuously score the revenue stream;
    using the smart contract factory to create a smart contract between the at least one lender and the borrower;
    using the processing unit take funds out of the revenue stream, which is used for a loan payment, and forward the rest to the borrower.

12. The method of claim 11, further comprising adding each lender to a payee queue.

13. The method of claim 11, further comprising forming a waiting queue of at least one additional lender who is not selected to fund the loan.

14. The method of claim 13, further comprising:
    using the ML model to detect a change in the revenue stream;
    increasing the loan amount if supported by the changes in the revenue stream;
    selecting at least one additional lender from the waiting queue to fund the increased loan amount with new lending terms; and
    creating a smart contract for each additional lender selected from the waiting queue.

15. A computer-implemented method, comprising:
    reviewing a loan application by a borrower based on a revenue stream of the borrower;
    accessing the borrower's revenue stream to collect training data related to the revenue stream and to process payments from a portion of the revenue stream;
    using a machine learning (ML) model, which is trained using the collected training data, wherein the ML model continuously analyzes and processes real-time financial information about the revenue stream to assign a score the revenue stream;
    generating terms of a loan agreement in view of the scored revenue stream;
    selecting a plurality of lenders to fund the loan agreement;
    creating at least one smart contract between at least one lender, which is selected from the lenders, and the borrower;
    generate at least one digital token associated with the at least one lender, wherein the digital token controls the portion of the revenue stream that is used to process payments; and
    allocating funds, under direction of the at least one smart contract, using the portion of the revenue stream, based on the digital token, for loan payments, and forwarding the rest of the revenue stream to the borrower.

16. The method of claim 15, further comprising:
increasing the loan amount if supported by changes in the revenue stream as detected by the ML model;
selecting at least one additional lender from a waiting queue to fund the increased loan amount; and
creating a smart contract for each additional lender.

17. A computer-readable media comprising computer-readable memory encoded with data that, when executed, causes a processing unit to process and execute a loan between at least one borrower and at least one lender selected from a plurality of lenders for a given loan amount, including:
 accessing the borrower's revenue stream to collect training data related to the revenue stream and to process payments from a portion of the revenue stream;
 using a machine learning (ML) model, which is trained using the collected training data, wherein the ML model continuously analyzes and processes real-time financial information about the revenue stream to assign a score the revenue stream;
 creating at least one smart contract between at least one lender, which is selected from the lenders, and the borrower; and
 under direction of the smart contract, taking funds out of the revenue stream, which is allocated for loan payments, and forwarding what is left of the revenue stream to the borrower.

18. The computer-readable media of claim 17, wherein the processing and the execution further include:
 increasing a loan amount if supported by changes in the revenue stream as detected by the ML model;
 selecting at least one additional lender from a waiting queue to fund the increased loan amount; and
 creating a smart contract for each additional lender.

* * * * *